L. HOFMEISTER.
TEAT CUP.
APPLICATION FILED MAY 5, 1919.

1,387,983.

Patented Aug. 16, 1921.

Inventor
Leo Hofmeister
By Morsell & Keeney
Attorneys.

UNITED STATES PATENT OFFICE.

LEO HOFMEISTER, OF MILWAUKEE, WISCONSIN.

TEAT-CUP.

1,387,983. Specification of Letters Patent. Patented Aug. 16, 1921.

Application filed May 5, 1919. Serial No. 294,870.

*To all whom it may concern:*

Be it known that I, LEO HOFMEISTER, a citizen of the United States, and resident of Milwaukee, in the county of Milwaukee and State of Wisconsin, have invented new and useful Improvements in Teat-Cups, of which the following is a description, reference being had to the accompanying drawings, which are a part of this specification.

My invention relates to certain new and useful improvements in teat cups, and refers more particularly to valve means therefor.

In the devices of this character now in general use, when the teat has been substantially drained, the suction action in the cup continues, often drawing blood, which in time will cause the death of the animal. Hence my invention has for its primary object to provide a valve mechanism for teat cups which will stop the suction action therein when the teat has been substantially drained.

A further object of this invention is to provide valve control which is of such compact and simple construction as to permit the same to be embodied with the teat cup to form a single unit with the same.

A further object of this invention is to provide a variable weight connected with the valve of the cup whereby the same will overcome the means for urging the valve to closed position as long as the normal flow of milk is obtained from the teat, but which is insufficient to affect the urging means when the flow of liquid has substantially ceased.

With the above and other objects in view, which will appear as the description proceeds, the present invention resides in the novel construction, combination and arrangement of parts substantially as hereinafter described and claimed, it being understood that such changes in the precise embodiment of the herein disclosed invention may be made as come within the scope of the claims.

Figure 1:
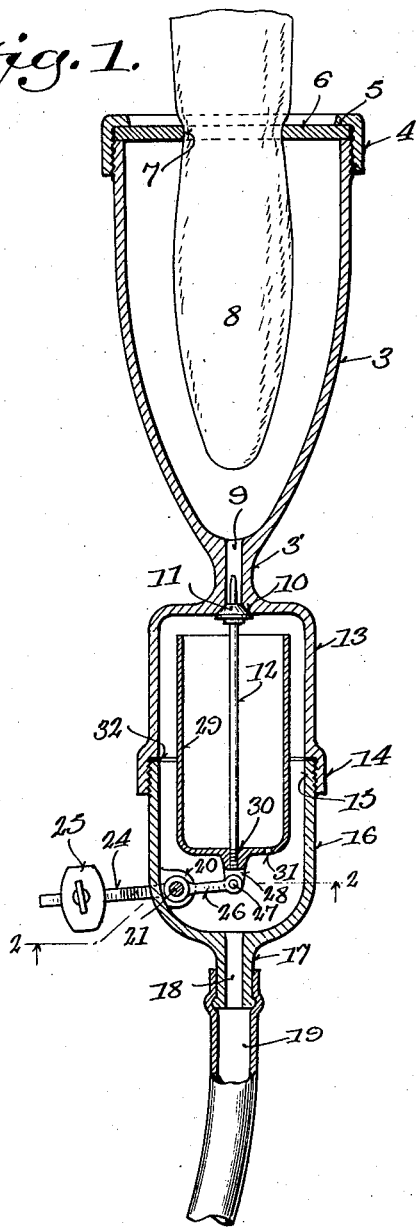
Figure 2:
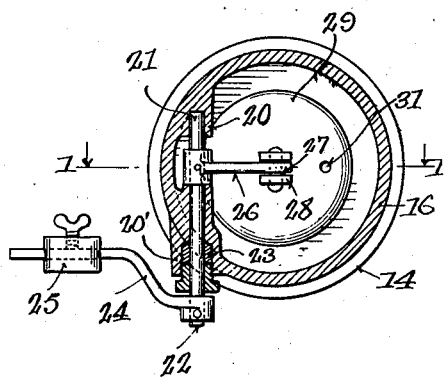

In the accompanying drawing, I have illustrated one complete example of the physical embodiment of my invention constructed according to the best mode I have so far devised for the practical application of the principles thereof, in which:

Figure 1 is a view part in section and part in elevation, said view being taken on the line 1—1 of Fig. 2; and Fig. 2 is a transverse sectional view taken on the line 2—2 of Fig. 1.

Referring now more particularly to the drawing, 3 designates a teat cup proper which has a member 4 in threaded engagement with its outer open end and having secured between its inwardly turned flange 5 and the outer edge of cup 3 a flexible member 6 having a central opening 7 for the reception of a teat 8. The cup 3 is substantially tapered toward its bottom and has in its restricted end 3′ a passageway 9 provided with a tapered valve seat 10 for engagement with valve 11 carried by the valve stem 12.

An inverted cup-shaped member 13 is formed on the lower end of the cup 3 and has its outer end bulged as at 14 and internally threaded to receive the threaded end 15 of a cup-shaped member 16, said member 16 having a coupling 17 formed on its outer closed end and provided with a passageway 18 communicating with the interior of member 16 and a flexible tubing 19 adapted to be engaged with a suction or pulsating mechanism (not shown).

Journaled in the pair of spaced ears 20 and 20′, formed integral with member 16, is a rod 21 having one end portion 22 thereof extended outwardly of the member 16 and being provided with a suitable stuffing box and packing 23 where it passes outwardly of ear 20 to prevent the escape of liquid therearound. Fixed to the end 22 of rod 21 is an outwardly extending arm 24 adjustably mounted on which is a counterbalance weight 25, and fixed to the shaft 21, intermediate the ears 20 and 20′, is a second arm 26 extending in a direction opposite to that of arm 24 and having its free end 27 pivoted between a pair of ears 28 formed on the bottom of a cup-shaped receptacle 29.

The stem 12 of valve 11, as best shown in Fig. 1, has its lower end centrally threaded in the bottom of receptacle 29 as at 30, and the bottom of said receptacle is provided with a restricted or slow discharge opening 31 for the purposes hereinafter stated. The weight 25 is adjusted so as to normally urge the receptacle 29, with its valve stem and valve, upwardly to hold the valve in engagement with its seat, as depicted in Fig. 1, thus cutting off the teat cup 3 from the suction, and when it is desired to open the cup 3 to the suction mechanism, the lever 24 is manually operated to move valve 11 out of its engagement with its seat. This operation connects the cup 3 with the suction created by the machine (not shown) and draws milk from the teat, the milk flowing through passageway 9 into receptacle 29.

The opening 31 is of such size as to discharge milk from container 29 at a rate slower than the normal flow of milk from teat 8, and thus the receptacle is rapidly filled, and when filled is of sufficient weight to overcome counterbalance 25, thus retaining the device in operation. When the teat 8 has become substantially drained in that the flow of milk therefrom is reduced to a rate slower than the discharge of milk from container 29 through its opening 31, the container is slowly drained and the valve 11 gradually engaged with the seat 10 as the weight decreases in said receptacle, as will be readily understood.

In order to maintain the suction in the chamber formed by members 13 and 16, a suitable washer 32 is provided where the two members join.

From the foregoing description, taken in connection with the drawing, it will be obvious that the variable weight is connected with the valve for overcoming its counterbalance means when the flow of milk from the teat is substantially normal, and for allowing closing of the valve by its counterbalance weight when the flow of milk has substantially ceased.

What I claim as my invention is:

1. A device of the class described, comprising a teat cup, a cup shaped member directly carried by the teat cup, a passageway connecting said teat cup and member, means connecting said member with a suction machine to draw liquid from the teat cup into said member from where it is discharged into a suitable receptacle, and means contained within the cup shaped member for varying the suction in the teat cup according to the flow of fluid.

2. A device of the class described, comprising, in combination, a teat cup, a cup shaped member directly carried thereby, a passageway connecting the interior of the teat cup with the interior of said member, a valve in said passageway, said valve being normally held open by the flow of liquid from the teat cup through the passageway, and means contained within said member for closing the valve when the flow from the teat cup substantially ceases.

3. The combination with a teat cup, of an inverted cup shaped member integral therewith, a passageway connecting the teat cup with said member, a receptacle vertically movably mounted in said member with its opened end in register with the passageway, a valve carried by the receptacle and movable to a position closing the passageway, said receptacle being moved from the passageway by the flow of fluid from the teat cup, and means for moving said receptacle, and with it the valve, toward the passageway to close the same when the flow substantially ceases.

4. A device of the class described, comprising a teat cup having a two part closed end cylindrical member carried thereby, a passage way connecting the teat cup and the cylindrical member, a transverse shaft journaled in said member and having one end positioned exteriorly thereof, a link member having one end fixed to said shaft, a receptacle having its lower end pivotally connected with said link and its upper open end positioned adjacent said passageway, a counter-balanced lever secured to the end of said shaft exteriorly of said member whereby said receptacle is normally yieldingly urged toward the passage way, a valve carried by said receptacle and operable to close said passage way when the receptacle is in its uppermost position, and means permitting the discharge from said receptacle of fluid at a predetermined rate, said receptacle being held away from the passage way by the fluid contained therein and being movable by said counter-balanced lever to close said passage way when the flow substantially ceases.

In testimony whereof, I affix my signature.

LEO HOFMEISTER.